United States Patent [19]
Margolis

[11] 3,829,659
[45] Aug. 13, 1974

[54] SYSTEM FOR COMPENSATING LINE-OF-SIGHT FROM STABILIZED PLATFORM AGAINST MISDIRECTION CAUSED BY LATERAL LINEAR ACCELERATIONS

[75] Inventor: Maier Margolis, Los Angeles, Calif.

[73] Assignee: Hughes Aircraft Company, Culver City, Calif.

[22] Filed: Nov. 24, 1972

[21] Appl. No.: 309,019

Related U.S. Application Data
[63] Continuation-in-part of Ser. No. 119,641, March 1, 1971, abandoned.

[52] U.S. Cl.... 235/61.5 S, 235/61.5 E, 235/61.5 G, 235/150.25
[51] Int. Cl............................ G06g 7/80, B64c 17/06
[58] Field of Search..... 235/61.5 R, 61.5 E, 61.5 G, 235/61.5 S, 150.25; 89/41 CE; 244/3.2; 178/DIG. 21; 73/178

[56] References Cited
UNITED STATES PATENTS

| | | | |
|---|---|---|---|
| 3,078,455 | 2/1963 | Brainin | 235/61.5 R |
| 3,284,617 | 11/1966 | Lerman | 235/150.25 |
| 3,518,372 | 6/1970 | Johns | 178/DIG. 21 |
| 3,576,124 | 4/1971 | O'Connor | 73/178 |
| 3,633,003 | 1/1972 | Talwani | 235/150.25 |
| 3,694,631 | 9/1972 | Cushman | 235/150.25 |

FOREIGN PATENTS OR APPLICATIONS
| | | | |
|---|---|---|---|
| 1,928,483 | 1/1971 | Germany | 235/61.5 R |

*Primary Examiner*—Felix D. Gruber
*Attorney, Agent, or Firm*—W. H. MacAllister; Allen A. Dicke, Jr.

[57] ABSTRACT

Linear acceleration is detected on a stabilized platform in the platform coordinates by means of accelerometers mounted on the platform. A directable device such as a sight is also mounted on the platform. The sight is directable so that its line-of-sight tracks a target. The acceleration signals are resolved into horizontal and vertical components. Approximate gravity is subtracted from the resolved vertical component so that the resolved signals represent approximately vertical and true horizontal components of linear acceleration in rectangular space. After scaling with respect to the distance to target, an integrator time integrates these signals to produce angular velocity signals. This information is stored in space coordinates. The stored signals are resolved into the coordinate system of the stabilized platform and are used to drive the stabilized platform. The platform drive is the final integration so the correction angle is produced.

3 Claims, 7 Drawing Figures

3,829,659

SYSTEM FOR COMPENSATING LINE-OF-SIGHT FROM STABILIZED PLATFORM AGAINST MISDIRECTION CAUSED BY LATERAL LINEAR ACCELERATIONS

CROSS REFERENCE

This application is a continuation-in-part of patent application Ser. No. 119,641, filed Mar. 1, 1971, and now abandoned.

BACKGROUND

The invention is directed to a system for positioning a platform including compensation for linear accelerations of the platform.

Past systems for aided tracking having incorporated angular motion sensors (gyros) which are connected so that angular rotation of the sight platform is compensated for, so that the sight platform is torqued to rotate in the appropriate directions for these angular motions. Thus, the platform upon which the sight is mounted does not change its pointing direction as a result of these rotations. Such devices normally need only gyros and suitable amplifiers for scaling to return an appropriate signal to the platform drive. however, such compensation devices do not detect and do not compensate for accelerations in any linear direction. Linear acceleration on any axis other than the line-of-sight will cause disturbance of the sighting direction. The previous gyro-stabilized platform systems have not overcome this problem.

When there is a line-of-sight from a stabilized platform to a nearby object (one that is not at effective infinity), linear acceleration which is lateral to the sighting axis displaces the line-of-sight from the target object. This invention is directed to the improvement wherein sensing of lateral linear acceleration is related to the estimated distance to the target to correct the line-of-sight, in accordance with the disturbing vector of the lateral linear acceleration.

SUMMARY

In order to aid in the understanding of this invention, it can be stated in essentially summary form that it is directed to a motion compensator for driving a stabilized platform on which is mountable the device directable along a line-of-sight to a target. Linear accelerations are detected and are resolved into generally upright and horizontal coordinates. In these coordinates, gravity is subtracted from the upright component and both components are integrated with respect to time. The information is acted upon as signals in these coordinates. These signals are resolved to platform coordinates and are used to torque the platform to provide platform motion appropriate to keep the line-of-sight directed toward the target.

Accordingly, it is an object of this invention to provide a motion compensator which compensates for the linear accelerations applied to a stabilized platform by moving the stabilized platform to overcome the effects of such acceleration. It is another object to provide a compensation system wherein linear accelerational signals are resolved into generally upright and horizontal space coordinates and the signals are processed within those space coordinates, followed by further resolving the computed signals back into platform coordinates for driving the platform. It is still another object to subtract substantially 1 g from a resolved substantially vertical linear accelerational signal, followed by resolving the signal back into platform coordinates to drive the platform. It is still another object to drive a stabilized platform to compensate for linear accelerations applied to the platform. It is another object to provide a stabilized platform in an airframe and to use platfrom command signals to drive the stabilized platform. It is a further object to receive signals from a sight platform control stick, resolve them into generally upright and horizontal rectangular coordinates, where integration with respect to time is performed and then followed by resolving the signals back into the coordinates of a platform mounted on the airframe and using these signals to drive the platform whereby the platform is properly controlled by the stick commands. Other objects and advantages of this invention will become apparent from a study of the following portion of the specification, the claims, and the attached drawings.

DESCRIPTION

Figure 1:
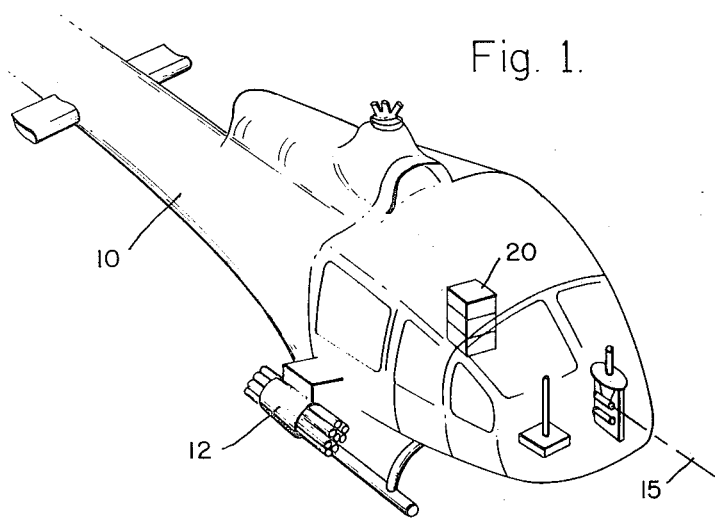
FIG. 1 is a perspective view of a helicopter, with parts broken away, showing the application of the motion compensator of this invention to a helicopter fire control system.

The motion compensation system of this invention is directed to the manner in which a stabilized platform carrying a directable device having a line-of-sight is stabilized against translational accelerations in directions generally across the line-of-sight of the sighting device. The motion compensation system is appropriately employed for directing from a moving mount a sighting device which is of military significance. To illustrate the manner in which the preferred embodiment is employed, a helicopter 10 is illustrated in FIG. 1. The helicopter is equipped with something to shoot at a target, in this case, missiles from missile cluster 12. A similar missile cluster can be mounted upon the other side of the helicopter, as well, or some other type of directable armament or other directable device may be employed with the motion compensator circuit. Additionally, in a forward part of the helicopter, see FIGS. 1 and 2, an optical sight 14 having a line-of-sight 15 is mounted upon a stabilized platform 16. A number of different types of optical and other devices can be enhanced in accuracy by being mounted on the platform stabilized in accordance with this invention. The specific example of sighting device described illustrates the use of the preferred embodiment of the motion compensator of this invention. The stabilized platform also carries infrared detector 18, mounted in association with optical sight 14.

The missiles of cluster 12 are associated with the optical sight 14 and infrared detector 18 through electronics in electronics package 20. The relationship is such that, when optical sight 14 is directed at a target and a missile is fired, the infrared detector 18 detects the position of the missile in front of helicopter 10 and, through a command link, directs it onto the line-of-sight from optical sight 14 to the target. Since this line-of-sight must be maintained on the target until the missile strikes, stabilization of platform 16 provides a higher probability of a hit.

Figure 2:
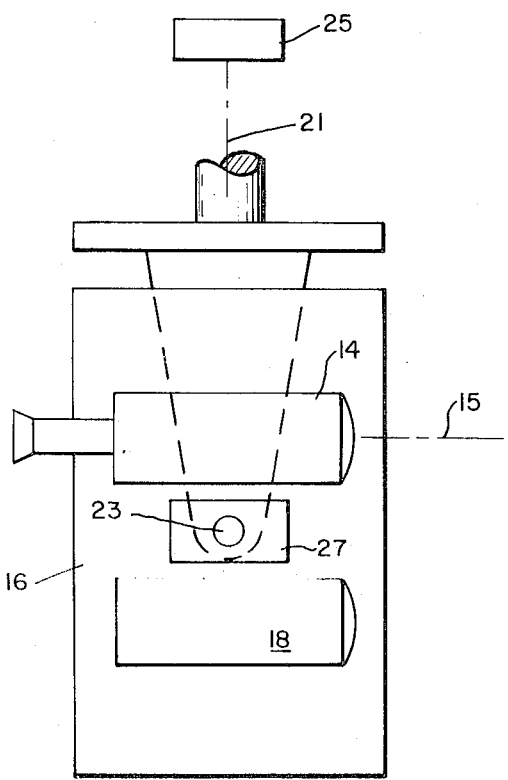
FIG. 2 is an elevation view of a schematic embodiment of a stabilized platform for mounting upon a helicopter airframe.

Other stabilization techniques stabilize the platform and the equipment carried thereon for angular motion. As illustrated in FIG. 2, platform 16 is gimbal-mounted for rotation on an azimuth or traverse axis 21, which is upright with respect to helicopter 10. Platform 16 is torqued on this axis by gyro 22. Platform 16 is pivoted for rotation on elevation axis 23 and is torqued on this axis by means of gyro 24. The angular positioning of platform 16 on these axes is signaled by position sensors 25 and 27, which can be direct actuated potentiometers. This is background for this invention. When it is recognized that the target at the end of the line-of-sight is effectively at a distance closer then infinity, linear accelerations in a direction lateral to the line-of-sight cause misdirection of the line-of-sight. The improvement in stabilization to which this invention is directed is to the method and apparatus by which these linear accelerations are considered and employed, together with an estimate of the distance to the target for correcting the direction of the line-of-sight to tend to maintain it directed toward the target.

Linear accelerations must be measured for the motion compensation of this invention. These linear accelerations can either be measured by linear accelerometers which measure accelerations in three rectangular coordinates with respect to the airframe of helicopter 10, or two linear accelerometers can be employed on stabilized platform 16 and measure accelerations with respect to the axes 21 and 23 thereof. The preferred embodiment employs the two accelerometers on stabilized platform 16, because the lesser number of components provides greater reliability. Accelerometer 26 is an accelerometer which measures lateral linear accelerations normal to the line-of-sight along the elevation axis 23 of platform 16. Accelerometer 28 measures linear accelerations normal to the line-of-sight and normal to elevation axis 23. The accelerometers are conventional structures, such as a spring returned mass which is moved by acceleration and has its position indicated by an AC excited potentiometer. On the other hand, a more complicated accelerometer such as shown in D. D. Williams Pat. No. 2,949,780 can provide both acceleration signals. Referring to FIG. 4, the two accelerometer signals are brought out in lines 30 and 32 as modulated signals, and are fed through amplifiers 34 and 36 to resolver 38.

As previously discussed, accelerometers 26 and 28 respectively measure linear accelerations with respect to the stabilized platform 16. These accelerations are both normal to the line-of-sight, one sensitive along to the elevation axis 23 and the other normal to it. This stabilized platform is not necessarily level, in the frame of reference of the earth. Resolver 38 is a resolver which is responsive to the vertical. This is accomplished by means of resolver driver 40 receiving a resolver position output signal through drive line 41 from resolver driver computer 43. Resolver driver 40 is a motor which moves driveline 41 the desired amount.

Resolver driver computer 43 has four signal inputs. The electronic package 20 includes helicopter flight control and navigation equipment, and includes gyros which provide signals related to helicopter attitude. The first signal to driver computer 43 is the helicopter pitch angle about a horizontal axis. The second signal to the computer is the helicopter roll angle about the helicopter roll axis. The next signal to the computer is the platform azimuth gimbal angle with respect to the helicopter, as provided by position sensor 25. The fourth signal to resolver driver computer 43 is the platform elevation gimbal angle provided by position sensor 27. Driver computer 43 processes these signals and provides a signal to resolver driver 40 such that drive line 41 drives a resolver 38 corresponding to the correction angle rho such that input signals to resolver 38 are in platform coordinates and output signals therefrom in lines 42 and 44 are in spatial coordinates. By definition, the angle rho is the angular difference between a line normal to the line-of-sight and the true vertical. Within these coordinates, the signals can be conveniently acted upon.

Resolver 38 is thus rotated unti the two accelerometer signals are resolved into a horizontal component and vertical component. Resolver 38 accomplishes the rotation of the accelerational vectors from the platform coordinates to the vertical and horizontal directions in space coordinates. These directions need not be precisely accurate, but a resolution into those general directions is satisfactory. The vertical accelerational signal is found in line 42, while the true horizontal signal is found in line 44.

Figure 5:
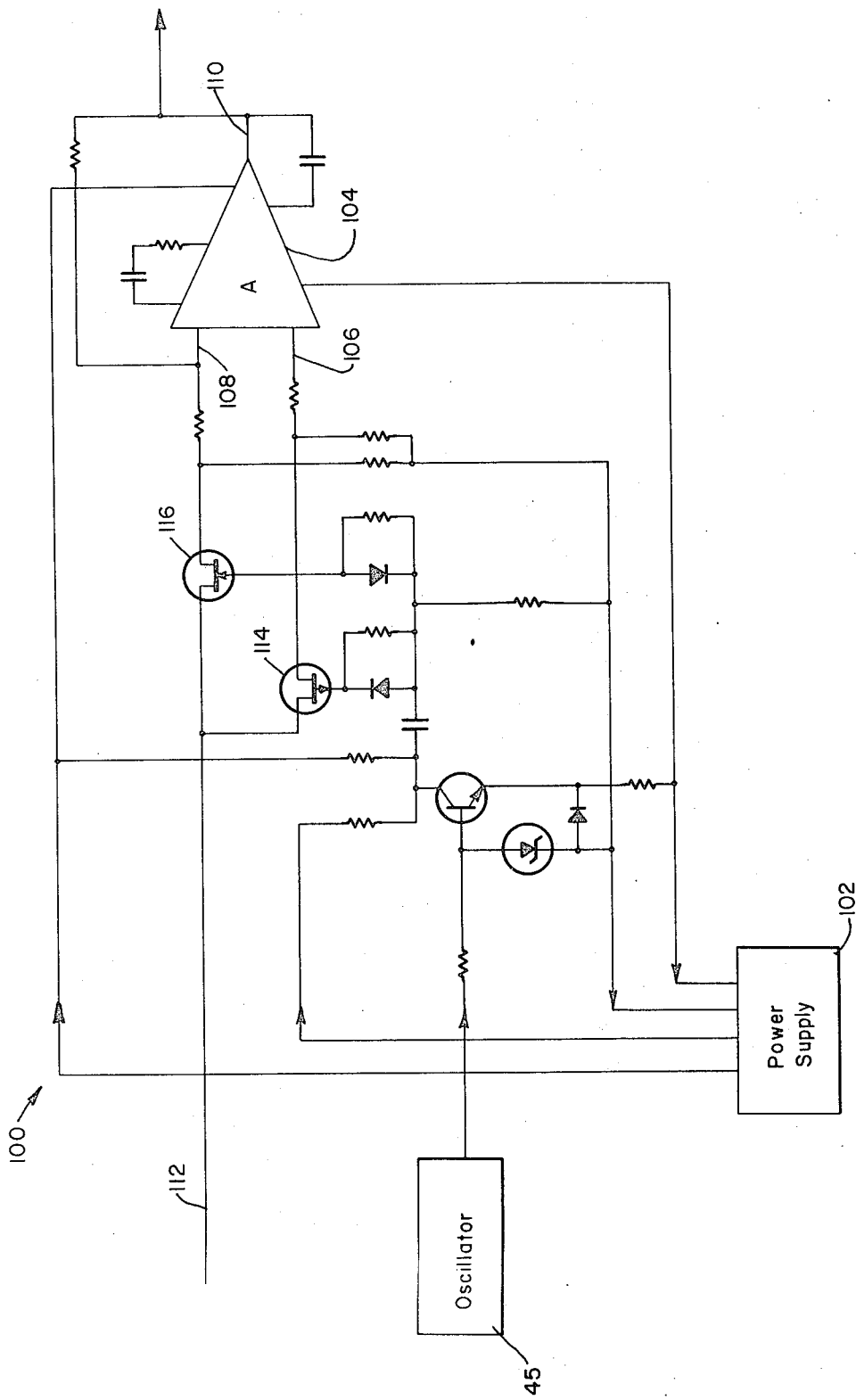
FIG. 5 is an electrical schematic diagram of a modulator-demodulator circuit.

Accelerometers 26 and 28 are excited from an alternating current source, such as form oscillator 45, see FIG. 5. Thus, lines 42 and 44 have an AC signal therein which is in phase with the signal of oscillator 45. A gravity signal is produced by gravity signal means 46. The gravity signal is simply a scaled value which added to the modulated signal on line 42 reduces it by the value of 1 g. For this reason, the gravity signal means 46 can be construed as producing a negative gravity signal. Since the gravity signal is not resolved by the correction angle rho, the signal after this point is substantially the vertical acceleration. A suitable signal source is a transformer driven by oscillator 45 with an output scaled and in such phase that it reduces the signal from accelerometer 28 in line 42 by the value of 1 g. Of course accelerometer 28 is in the earth's gravity fields, and the subtraction of this vertical 1 g provides a signal in line 49 which is substantially representative of vertical accelerations caused by a helicopter motion. The summing of the negative gravity signal in summer 48 thus represents the generally spatial upright direction. This signal goes to phase detector or demodulator 50, while line 44 with the horizontal acceleration signal goes to phase detector or demodulator 52. These detectors convert the signals to DC signals.

Modulator/demodulator 100 is illustrative of the several circuits which can be used either as a modulator or as a phase detector or demodulator circuit. The modulator/demodulator is illustrated in FIG. 5. It has a power supply 102 which supplies the power requirements of the circuit, including the power requirements of amplifier 104. Amplifier 104 is an operational amplifier. Such operational amplifiers are commercially available as CMER 19106 or Fairchild SL 7014. A similar operational amplifier is described in U.S. Pat. No. 3,622,770. Amplifier 104 has a non-inverting input 106, and an inverting input 108. The operational amplifier is constructed so that when a positive signal is applied to noninverting input 106, a positive signal appears at output 110. Furthermore, when a positive signal is applied to inverting input 108, a negative signal appears at output 110. When negative signals are applied, the outputs are respectively negative and positive. Power supply 102 also has several connections to the amplifier 104 to supply its power requirements.

Input line 112 is connected to parallel FET switches 114 and 116, which are respectively connected to noninverting input 106 and inverting input 108. Thus, when a positive DC signal is on input line 112, and switches 114 and 116 are alternately operated at a predetermined frequency, output line 110 shows a squarewave signal at the predetermined frequency and of amplitude corresponding to the amplitude of the input signal.

Oscillator 45 is the power supply oscillator in the helicopter and thus provides a reference frequency for the entire circuit. The same oscillator excites the device supplying the negative gravity signal from device 46, and also excites the accelerometers. Oscillator 45 is connected to alternately operate switches 114 and 116 and is arranged so that a positive signal from the oscillator turns on switch 114 and a negative signal turns off switch 114 and turns on switch 116. Thus, the output in line 110 is at the same frequency of the oscillator and is in phase with it. When an AC signal is applied to input line 112, it is originally excited by the same oscillator 45, and thus is in phase with oscillator 45. Thus, when the incoming signal in line 112 is positive, oscillator 45 emits a positive signal and switch 114 is turned on so that output line 110 can carry the positive signal. When the AC signal in line 112 is negative, oscillator 45 is negative so that switch 116 is turned on. With a negative signal going into the inverting input 108, a positive signal results in output line 110. Therefore, modulator/demodulator 100 serves to modulate a DC input signal and serves to demodulate an AC input signal which is in phase with the oscillator. The circuit 100 can also be called a phase detector when it is operating in the demodulator mode.

Going back to FIG. 4, the signal in line 49 is connected to demodulator 50, and the signal in line 44 is connected to demodulator 52. Both of these demodulators are demodulators of the type described above and illustrated in FIG. 5.

The output from demodulators 50 and 52 has a certain amount of ripple, because the input to the demodulators is smoothed by system impedance to be substantially in the form of sine waves so that the output is substantially a rectified sine wave. Filters 51 and 53 smooth the signals. These signals are DC, with the potential thereof respectively representing substantially upright and transverse linear accelerations in space coordinates. Time integration of these signals, with suitable scaling for distance factor in resistors 58 and 60, results in a signal which corresponds to the angular velocity of the target due to linear accelerations along either of the sensitive axes, in space coordinates. Integrators 54 and 56 each comprise an integrating capacitor the charge on which controls an amplifier so that the amplifier output corresponds to the charge on the capacitor. The manually operable integration enabling switch 59 is actuated which causes FET switches 55 and 57 switches to be conductive to permit the signal to pass through the scaling resistors to the integrating capacitors and causes FET switches 61 and 63 to be nonconductive to permit the integrating capacitors to charge with the respective signals. In the nonenabled mode, the capacitors are shorted through the FET switches in order to prevent stray charge from building up on the capacitors during nonoperation.

The integrated signals now represent vertical and horizontal angular rates in the rectangular space coordinates representing approximately vertical and true horizontal. These signals are respectively modulated by modulators 66 and 68, each identical to modulator 100, to provide an AC signal. These signals are filtered through filter amplifiers and are connected to resolver 70. Resolver 70 can be part of or mechanically coupled to resolver 38, or can be a separate resolver. It is driven by driver 40 through the same angle rho. It has the same function and resolves the signals from the rectangular space coordinates to the upright and crosswise rectangular reference coordinates of the stabilized platform 16. The resultant signals are again demodulated by demodulators 72 and 74, identical to demodulator 100, to convert them to DC signals. These signals are fed back through lines 73 and 75 to torque the gyros 22 and 24. This force turns the stabilized platform. The platform motion resulting from the signal results in another integration so that the platform is turned an appropriate angle to compensate for the linear accelerations at an angle to the line-of-sight. Thus, the linear accelerations are compensated for and the tracking of the sighting device is aided.

Figure 3:
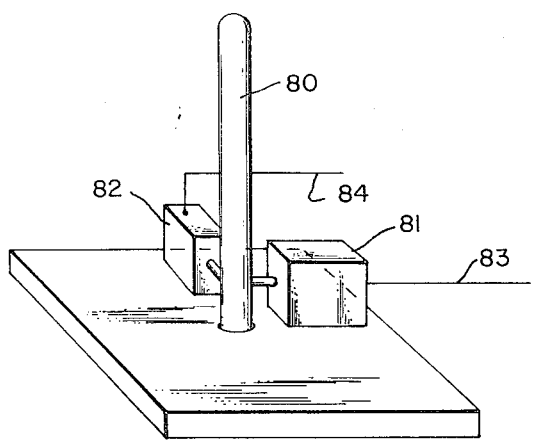
FIG. 3 is a perspective view of a simplified control stick for directing the sight.

Some of the linear upward and lateral accelerations are caused by vibrations and wind currents and other external forces acting upon the helicopter 10. Some of them are caused by the pilot's action on the controls of the helicopter. It is these accelerations which are compensated for. In addition to the utilization of the accelerometers, signals can be taken directly from the sight steering controls. A control stick for controlling platform motion is shown at 80, see FIGS. 3 and 4. The stick is merely exemplary, and should other controlling devices be employed, signals could be obtained from them. Position transducers, such as potentiometers 81 and 82 are connected to the control stick 80 and respectively have outputs in lines 83 and 84 corresponding to motion in the elevational and traverse direction of the stabilized platform. These signals are modulated by modulators 85 and 86. Modulators 85 and 86 each identical to the modulator 100. They receive the DC signals in lines 83 and 84 and modulate them at the frequency of oscillator 45. The square wave output of modulators 85 and 86 go to filter amplifiers 87 and 88 which emit an appropriately amplified signal which is sufficiently rounded from the square wave out of the modulators so the wave shape resembles the shape of the waves out of the accelerometers 26 and 28. The filter amplifiers also provide suitable scaling so that the signals originating from position of control stick 80 can be added into lines 30 and 32. If the position sensors 81 and 82 provide AC signals, as for example an oscillator excited potentiometer, the modulators 85 and 86 can be dispensed with. Amplfiers 87 and 88 can then be used for scaling.

When the target is stationary and helicopter 10 is moving, accelerometer 26 and 28 measure the accelerations that cause relative angular motion; these signals are transformed into substantially space coordinates. These coordinates then are integrated by integrators 54 and 56 and the signal is stored and used. The output is re-resolved into the coordinates of platform 16 and the gyros are precessed to drive the platform. With all scaling correct, the sight remains directed upon the target so that no additional sight directing is necessary.

However, when the target is moving and the helicopter is substantially stationary, then the sight direction provided by the operator by manual operation of stick 80 is the signal to be applied for directing the sight platform. The gunner looks through the optical sight and manipulates stick 80 to direct the line-of-sight 15 to target. In this mode of operation, it is superior to reduce the effect of the accelerometer signal and increase the effect of the stick signals into the integrators.

Figure 4A:
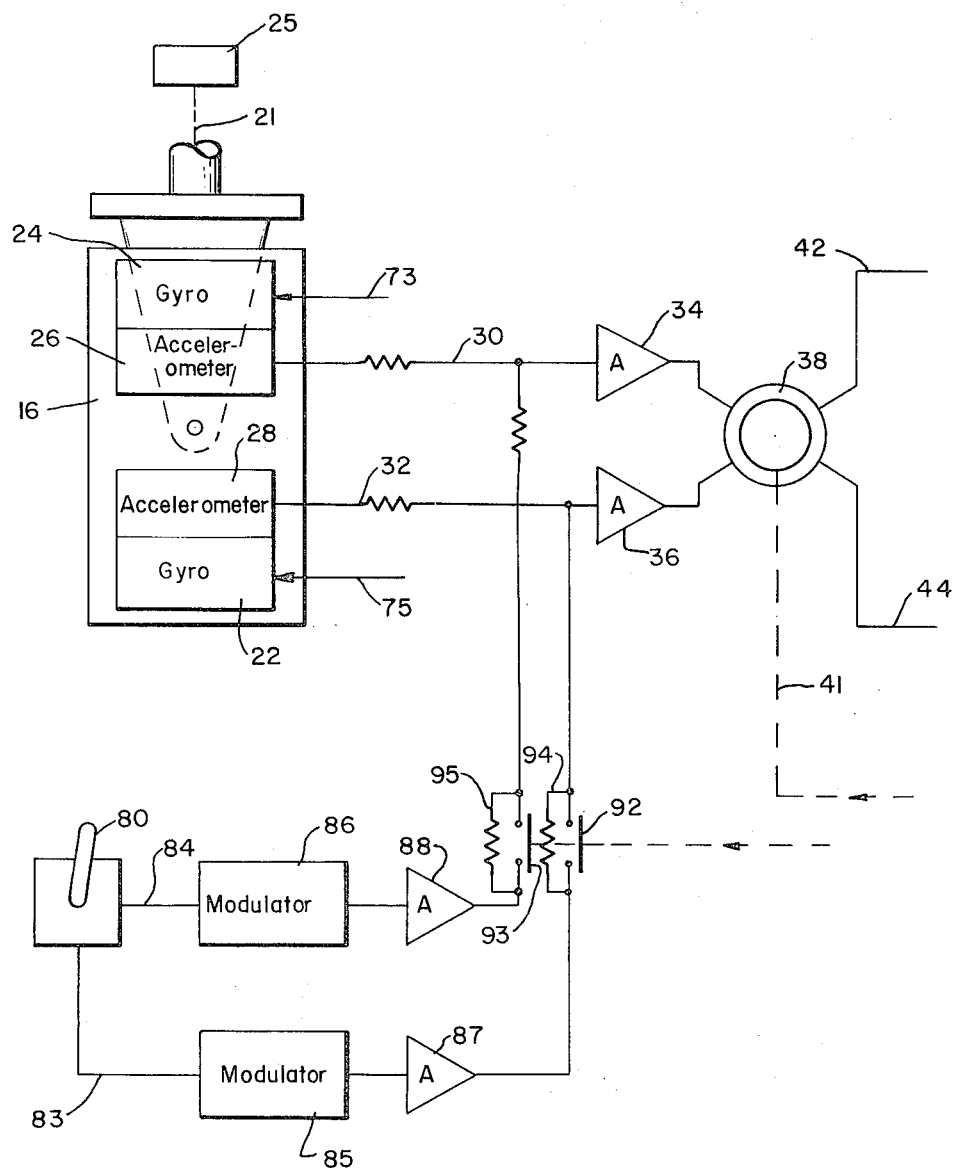
FIGS. 4A through 4C taken together are structural schematic electric diagrams showing the structural blocks by which the computations are made.
Figure 4B:
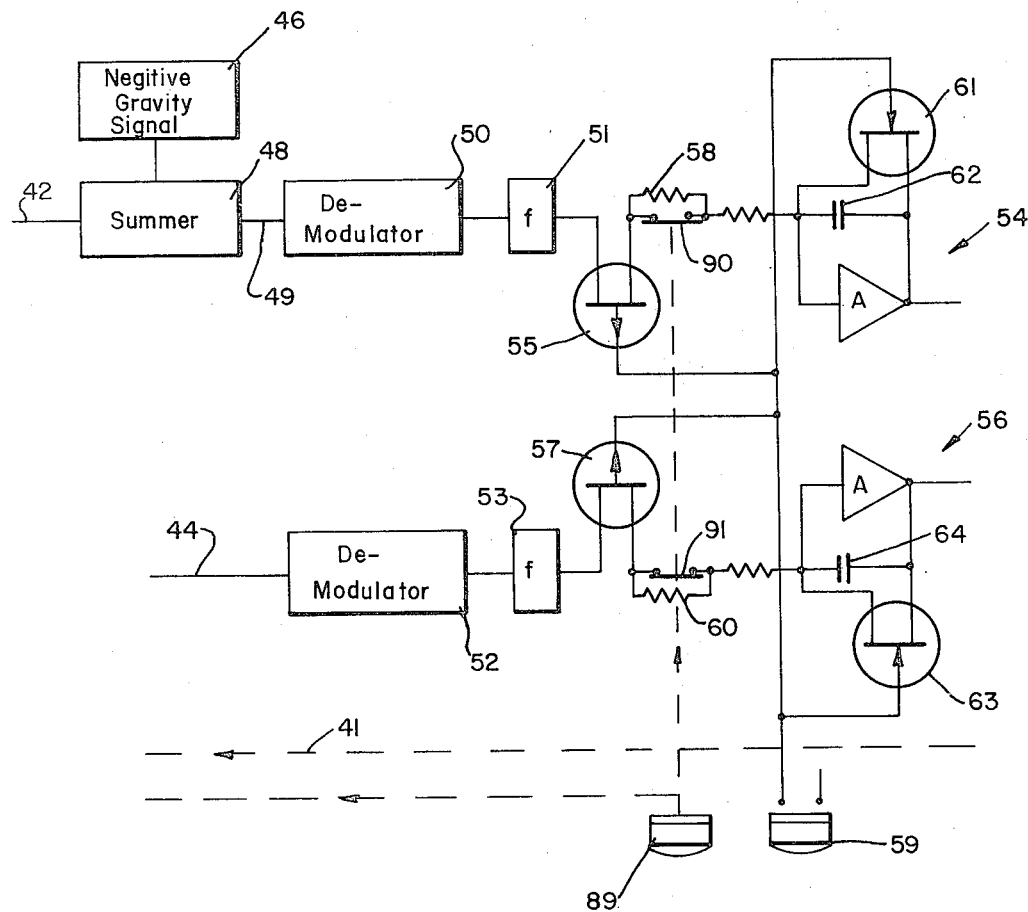
Figure 4C:
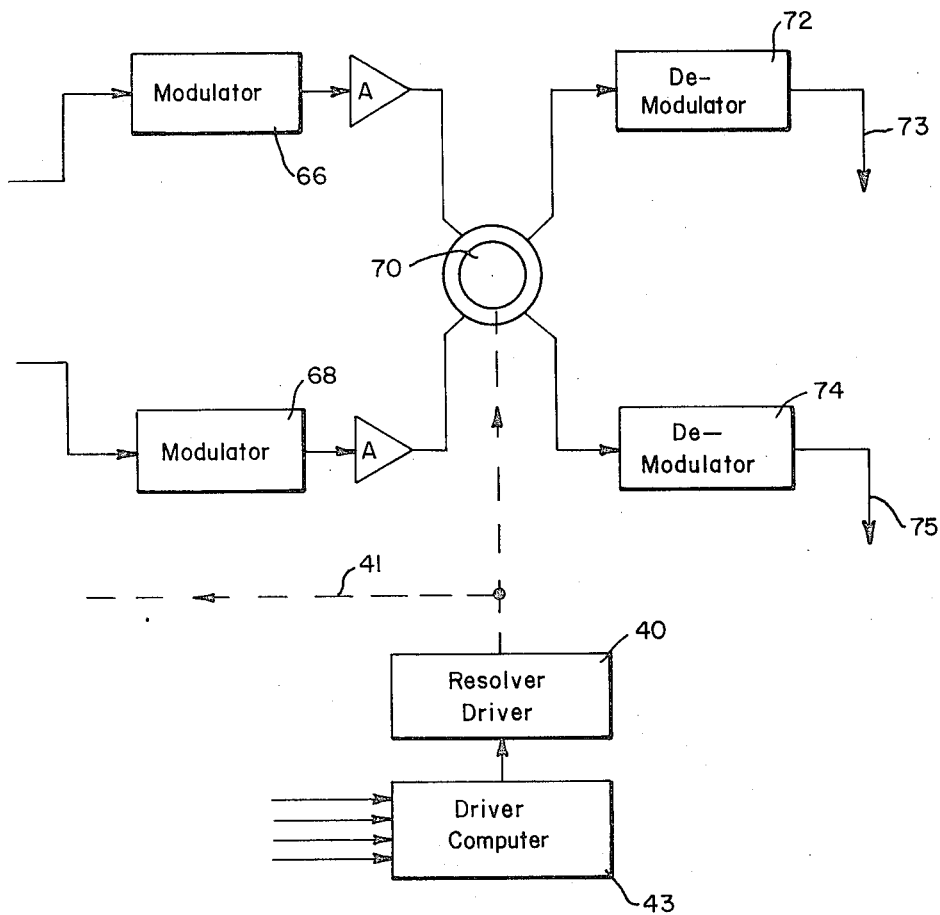

Operator 89 is connected to close bypass switches 90 and 91 across distance scaling resistors 58 and 60, and close switches 92 and 93 across scaling resistors 94 and 95 when actuated, see FIGS. 4A and 4B. In the position shown, switches 90 and 91 are closed to bypass part of the scaling resistor into the integrators. At the same time, switches 92 and 93 are open so that the stick signal is reduced by scaling resistors 94 and 95. In this balance of values, the signals from the accelerometers are the major signal source to the integrators. When target motion is a substantial portion of the motion that requires swinging of the line-of-sight, then operator 89 is moved to the other position where the influence of the position stick 80 has greater influence upon the signal fed to the integrators. In the latter, tracking position of operator 89, if the helicopter 10 is stationary and stick 80 is deflected to follow a target moving at a constant angular rate, the integrators 54 and 56 charge up to a point where if stick 80 was released, the sight would continue to swing. In either case, the sight directing information is transformed into substantially a spatial coordinate and within those coordinates it is processed and stored.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A motion compensator system for compensating for linear acceleration applied to a stabilized platform to provide a stabilizing adjustment to the platform so that a directable device mounted upon the platform and having a line-of-sight to a target receives platform adjustments which tend to maintain the line-of-sight directed toward the target, said motion compensator system comprising:

means for detecting linear acceleration applied to the platform in first coordinates normal to each other and normal to the line-of-sight, one of the coordinates being along the elevation axis, said means for detecting linear acceleration producing first and second signals corresponding to the two directions of detected linear acceleration;

means for resolving both the first and second accelerations signals from the first coordinates into resolved signals in second coordinates having corresponding substantially vertical and horizontal component signals;

means for subtracting a signal substantially corresponding to the acceleration of gravity from the substantially vertical component signal;

means for separately integrating each of the resolved signals with respect to time and scaling them with respect to the distance to the target so that the resultant computed signal is related to the angular velocity of the line-of-sight;

means for further resolving the signals from the means for integrating into platform coordinates; and means for causing the further resolved signals to torque the platform to stabilize the platform.

2. The system of claim 1 wherein said means for separately integrating comprises for each integration:

a capacitor and an amplifier in parallel to said capacitor; and charging control means connected to said capacitor for controlling the charging of said capacitor, said charging control means being controlled in accordance with distance to the target.

3. The system of claim 1 wherein:

said means for detecting linear accelerations applied to the platform comprises a first accelerometer mounted on said platform and sensitive in a generally upright direction normal to the line-of-sight and producing an elevational accelerational signal which is upright in platform coordinates, and a second accelerometer mounted on said platform and sensitive in a direction normal to said line-of-sight and generally transverse to said upright direction for producing an azimuthal accelerational signal in platform coordinates for accelerations generally transverse to the line-of-sight;

said means for resolving the accelerational signal comprises means for resolving both the upright and transverse accelerational signals to result in a vertical signal and a horizontal signal in space coordinates;

said means for further resolving the signals comprises separate means for separately further resolving the substantially vertical signal and horizontal signal into separate elevational and azimuthal signals in platform coordinates; and said means for causing the further resolved signals to torque the platform comprises separate means for torquing the platform to move the line-of-sight in an elevation direction and a separate means to torque the platform to move the line-of-sight in an azimuth direction.

* * * * *